United States Patent
Iijima

(10) Patent No.: US 10,465,934 B2
(45) Date of Patent: Nov. 5, 2019

(54) AIR CONDITIONER

(71) Applicant: Mitsubishi Electric Corporation, Tokyo (JP)

(72) Inventor: Hirokazu Iijima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 169 days.

(21) Appl. No.: 15/544,582

(22) PCT Filed: Mar. 23, 2015

(86) PCT No.: PCT/JP2015/058781
§ 371 (c)(1),
(2) Date: Jul. 19, 2017

(87) PCT Pub. No.: WO2016/151739
PCT Pub. Date: Sep. 29, 2016

(65) Prior Publication Data
US 2017/0350613 A1 Dec. 7, 2017

(51) Int. Cl.
*F24F 11/30* (2018.01)
*G01J 5/00* (2006.01)
(Continued)

(52) U.S. Cl.
CPC ............ *F24F 11/30* (2018.01); *G01J 5/0025* (2013.01); *G01J 5/026* (2013.01); *G01J 5/047* (2013.01);
(Continued)

(58) Field of Classification Search
CPC .. F24F 11/30; F24F 11/32; F24F 11/63; F24F 2110/10; F24F 2120/10; G01J 5/047; G01J 5/026; G01J 5/0025
See application file for complete search history.

(56) References Cited

U.S. PATENT DOCUMENTS

| 6,626,835 B1* | 9/2003 | Kraus | G01J 5/0003 374/E13.003 |
| 2013/0321637 A1* | 12/2013 | Frank | H04N 5/33 348/152 |
| 2016/0187022 A1 | 6/2016 | Miwa et al. | |

FOREIGN PATENT DOCUMENTS

| JP | 2000-270269 A | 9/2000 |
| JP | 2010-091158 A | 4/2010 |

(Continued)

OTHER PUBLICATIONS

Ono et al., Air Conditioner, Aug. 16, 2012, JP2012154591A, Whole Document (Year: 2012).*

(Continued)

*Primary Examiner* — Larry L Furdge
(74) *Attorney, Agent, or Firm* — Posz Law Group, PLC

(57) ABSTRACT

An air conditioner includes an outdoor device and an indoor device. The indoor device includes a control unit, a storage unit, and an infrared sensor unit that detects a human by detecting infrared rays. The infrared sensor unit includes thermal-image acquisition elements that detect infrared rays to acquire thermal image data and a sensor control unit that controls the thermal-image acquisition elements. When receiving the thermal image data from the infrared sensor unit, the control unit determines whether a communication error has occurred in each of the thermal-image acquisition elements. The control unit sets a thermal-image acquisition element that has a number of error determinations equal to or larger than a certain number as a communication-error established element. The control unit does not acquire thermal image data from the communication-error established element.

3 Claims, 9 Drawing Sheets

(51) Int. Cl.
*G01J 5/02* (2006.01)
*G01J 5/04* (2006.01)
*F24F 11/63* (2018.01)
*F24F 120/10* (2018.01)
*F24F 110/10* (2018.01)
*F24F 11/32* (2018.01)

(52) U.S. Cl.
CPC ............... *F24F 11/32* (2018.01); *F24F 11/63* (2018.01); *F24F 2110/10* (2018.01); *F24F 2120/10* (2018.01)

(56) References Cited

FOREIGN PATENT DOCUMENTS

| | | | |
|---|---|---|---|
| JP | 2010-216688 | A | 9/2010 |
| JP | 2012-154591 | A | 8/2012 |
| JP | 2012154591 | A * | 8/2012 |
| WO | 2015-029378 | A1 | 3/2015 |

OTHER PUBLICATIONS

International Search Report of the International Searching Authority dated Jun. 16, 2015 for the corresponding international application No. PCT/JP2015/058781 (and English translation).
European Search Report dated Apr. 4, 2017 for the corresponding EP application No. 15 86 2140.
Notification of Reasons for Refusal dated Oct. 24, 2017 by the Japanese Patent Office in connection with the corresponding Japanese Patent Application No. 2017-507197 (and English translation).

* cited by examiner

AIR CONDITIONER

CROSS REFERENCE TO RELATED APPLICATION

This application is a U.S. national stage application of International Patent Application No. PCT/JP2015/058781 filed on Mar. 23, 2015, the disclosure of which is incorporated herein by reference.

TECHNICAL FIELD

The present invention relates to an air conditioner.

BACKGROUND

There is an air conditioner that includes an infrared sensor unit provided in an indoor device to detect a human based on thermal image data acquired by the infrared sensor unit, and controls an operation based on a detection result. Patent Literature 1 describes to determine whether a communication error has occurred at the time of reception of thermal image data transmitted from an infrared sensor unit at each step. If any communication error has not occurred, or although a communication error has occurred, if thermal image data can be acquired by a thermal-image acquisition element group as a result of an instruction to the infrared sensor unit to retransmit the thermal image data in which a communication error has occurred, up to a preset upper limit of the number of communication retries, the thermal image data acquired by the thermal-image acquisition element group at the step is buffered. If a communication error has occurred and thermal image data has not been acquired within the number of communication retries, alternative data is buffered instead of the thermal image data acquired by the thermal-image acquisition element group for the step. If the number of buffering of the alternative data through all the steps is less than a predetermined threshold number, one thermal image of a scanning area is created by using all the pieces of data buffered at all the steps.

Patent Literature

Patent Literature 1: Japanese Patent Application Laid-open No. 2012-154591

In Patent Literature 1, acquisition of the thermal image data is retried for a thermal-image acquisition element in which a communication error has occurred at the time of acquiring the thermal image, and if the thermal image data cannot be acquired even if retries are performed for a certain number of times, the thermal image is acquired by using the alternative data so that human detection can be performed without using a noise filter. In the device described in Patent Literature 1, the communication time becomes long because of acquiring the data from all the thermal-image acquisition elements at the time of acquiring the thermal image, and a delay may occur in reflecting the human detection information in the control of an air conditioner.

SUMMARY

The present invention has been achieved in view of the above problems, and an object of the present invention is to provide an air conditioner that can reduce a communication time with an infrared sensor unit and can improve responsiveness of control based on thermal image data.

According to an aspect of the present invention in order to solve the problems and achieve the object, there is provided an air conditioner including: an indoor device; and an outdoor device connected to the indoor device, wherein the indoor device includes: an infrared sensor unit that has a plurality of thermal-image acquisition elements and a sensor control unit that controls the thermal-image acquisition elements, scans a scanning area step by step to acquire thermal image data by the thermal-image acquisition elements at each step, and transmits the acquired thermal image data from the sensor control unit to outside, a sensor drive motor that moves the infrared sensor unit, and a control unit that determines whether an error has occurred in communication for each of the thermal-image acquisition elements, at a time of reception of the thermal image data transmitted from the infrared sensor unit, and sets the thermal-image acquisition element whose sum of number of times of determination that an error has occurred in the communication is equal to or larger than a threshold as a communication-error established element, and does not acquire the thermal image data from the thermal-image acquisition element set as the communication-error established element.

According to the present invention, it is possible to reduce a communication time with an infrared sensor unit and improve responsiveness of control based on thermal image data.

DETAILED DESCRIPTION

Exemplary embodiments of an air conditioner according to the present invention will be explained below in detail with reference to the accompanying drawings. The present invention is not limited to the embodiments.

First Embodiment

Figure 1:
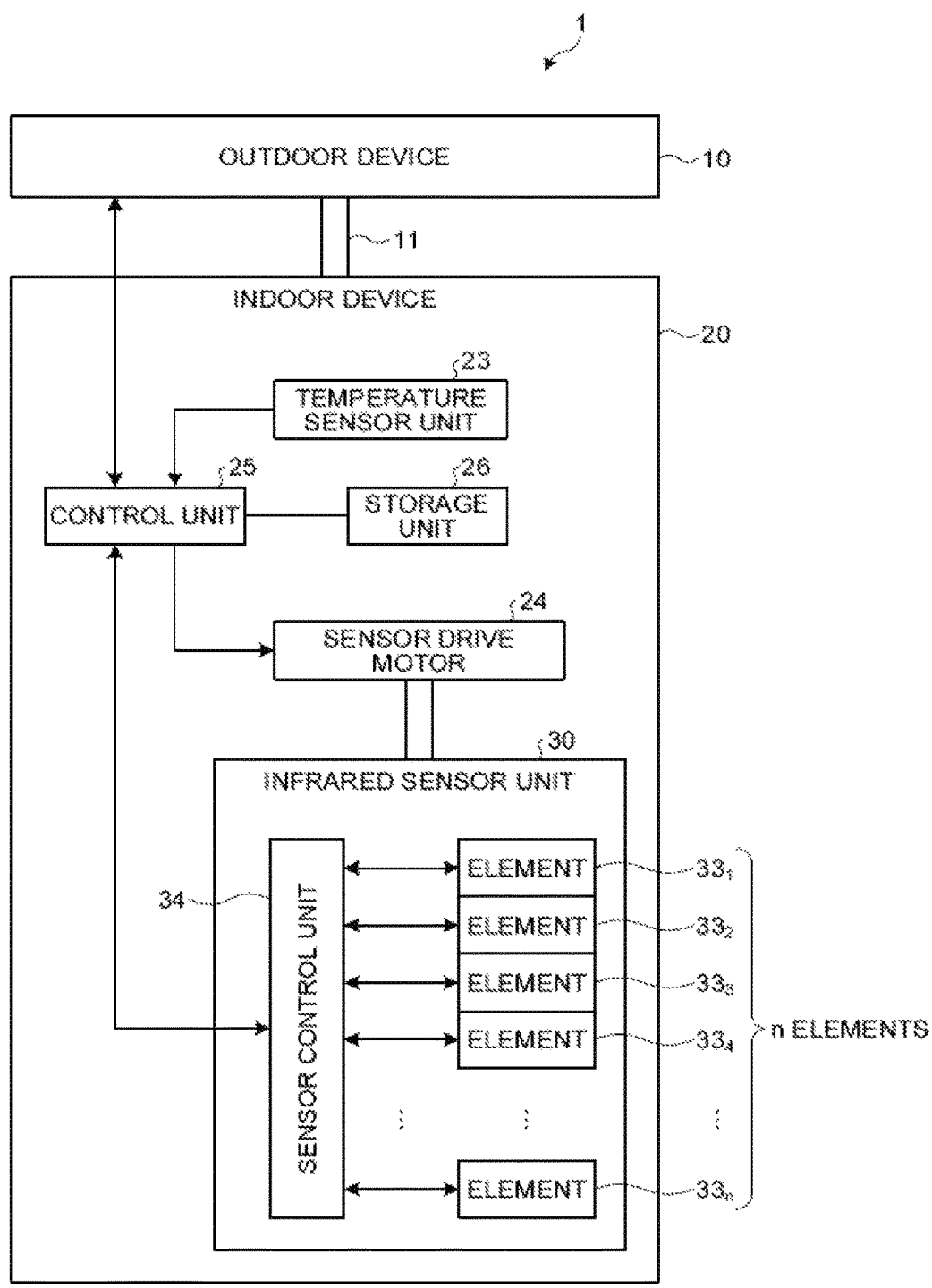
FIG. 1 is a block diagram illustrating a configuration of an air conditioner.

FIG. 1 is a block diagram illustrating a configuration of an air conditioner 1 according to a first embodiment. The air conditioner 1 includes an outdoor device 10 installed outside a room, and an indoor device 20 installed inside the room to perform air conditioning inside the room. In the air conditioner 1, the outdoor device 10 and the indoor device 20 are connected by a connecting pipe 11 that circulates a heat medium, thereby circulating the heat medium between the outdoor device 10 and the indoor device 20.

The indoor device 20 includes a temperature sensor unit 23 that acquires information of the ambient temperature inside the room, a control unit 25 that controls the indoor device 20, a storage unit 26 that stores therein acquired data, an infrared sensor unit 30 that acquires thermal image data by detecting infrared rays, and a sensor drive motor 24 that drives the infrared sensor unit 30. The temperature sensor unit 23 is provided, for example, at an air suction port of the indoor device 20 in order to measure the temperature of air sucked into the indoor device 20 and acquire the measured temperature as the ambient temperature inside the room. The control unit 25 is communicably connected with the outdoor device 10, the temperature sensor unit 23, the storage unit 26, the infrared sensor unit 30, and the sensor drive unit 24. The sensor drive unit 24 and the infrared sensor unit 30 are physically connected with each other.

The control unit 25 controls the operation of respective units of the indoor device 20. The control unit 25 switches a command to a start operation or shutdown, and air conditioning modes such as heating, cooling, and dry based on a signal of a command related to air conditioning (hereinafter, "command signal"), and changes an increase or a decrease of the air-conditioned temperature and the direction of feeding air from the indoor device 20. Further, the control unit 25 acquires thermal image data by controlling the operation of the infrared sensor unit 30 and the sensor drive motor 24, thereby changing the condition of the operation based on the acquired thermal image data.

The infrared sensor unit 30 has n thermal-image acquisition elements (also simply "element") 331, 332, 333, 334, . . . , 33n, and a sensor control unit 34 that controls then thermal-image acquisition elements 331 to 33n. The thermal-image acquisition elements 331, 332, 333, 334, . . . , 33n respectively acquire thermal image data by detecting infrared rays in a target detection range; thus, the thermal-image acquisition elements 331, 332, 333, 334, . . . , 33n are infrared sensors. The thermal image data is at least one of information of the elements that have detected, information of the detected infrared rays, and information of temperature acquired from the detected infrared rays. The thermal-image acquisition elements 331 to 33n according to the present embodiment are linearly arrayed in a row. The mode of the infrared sensor unit 30 is not limited to the mode in which the thermal-image acquisition elements 331 to 33n are linearly arrayed in a row in a vertical direction, and it is also possible to employ a mode in which the thermal-image acquisition elements 331 to 33n are arrayed in a plurality of rows, or a mode in which the thermal-image acquisition elements 331 to 33n are arrayed in a curved manner. The infrared sensor unit 30 detects infrared rays emitted from an area corresponding to one row of the thermal-image acquisition elements 331 to 33n by each of the thermal-image acquisition elements 331 to 33n. The respective thermal-image acquisition elements 331 to 33n can have the same specification with each other, or a specification different from each other. It suffices that n is an integer equal to or larger than 2, and the number thereof is not limited. The sensor control unit 34 is communicably connected with the n thermal-image acquisition elements 331 to 33n and the control unit 25, and transmits data acquired by the thermal-image acquisition elements 331 to 33n to the control unit 25.

The sensor control unit 34 is communicably connected with the n thermal-image acquisition elements $33_1$ to $33_n$, and the control unit 25, and transmits data acquired by the thermal-image acquisition elements $33_1$ to $33_n$ to the control unit 25.

The sensor drive motor 24 moves the infrared sensor unit 30 in a direction orthogonal to an array direction of the thermal-image acquisition elements $33_1$ to $33_n$, so that an area in which the infrared sensor unit 30 detects infrared rays is moved to the direction orthogonal to the array direction. The sensor drive motor 24 can translate the infrared sensor unit 30 or can rotate the infrared sensor unit 30.

The control unit 25 acquires a thermal image of a predetermined region by driving the sensor drive motor 24 to move the infrared sensor unit 30 in a stepwise manner and scan the scanning area row by row, that is, step by step, and acquiring the thermal image data at each step (at each position) by the infrared sensor unit 30. In this manner, the control unit 25 controls a stage at which the infrared sensor unit 30 scans and a row in which the infrared sensor unit 30 detects infrared rays, by controlling the drive of the sensor drive motor 24. The control unit 25 acquires information of the row in which the infrared sensor unit 30 detects infrared rays based on the position information of the sensor drive motor 24.

The control unit 25 is a processor such as a CPU (Central Processing Unit), and is a device that executes commands described in a computer program, that is, transfer, computation, processing, and control of data, and other processes. The control unit 25 executes the computer program stored in the storage unit 26, while using a part of the storage unit 26 as a work area. The computer program is a BIOS (Basic Input/Output System) or a UEFI (Unified Extensible Firmware Interface), an operating system program, and a control program. The processes related to control of the indoor device 20 as well as processes performed by the indoor device 20 with respect to the outdoor device 10 and the infrared sensor unit 30 are performed by the control unit 25.

The storage unit 26 is a RAM (Random Access Memory), a ROM (Read Only Memory), an SSD (Solid State Drive), an HDD (Hard Disc Drive), or a combination thereof, and is a device that stores therein the computer program executed by the control unit 25 and information required for processes of the control unit 25. The storage unit 26 stores therein a database to be used at the time of controlling the indoor device 20 and when the indoor device 20 controls the outdoor device 10 and the infrared sensor unit 30.

Figure 2:
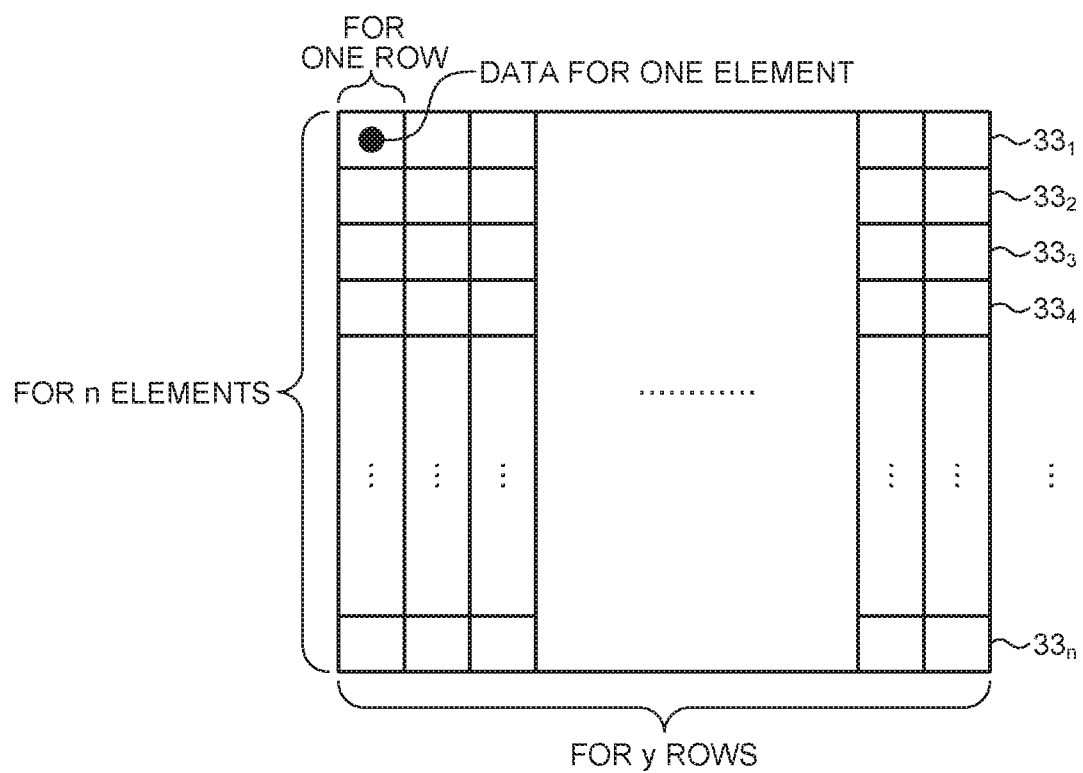
FIG. 2 is a diagram illustrating a scanning area of an infrared sensor unit

FIG. 2 is a diagram illustrating a scanning area of the infrared sensor unit 30. The infrared sensor unit 30 acquires the pieces of thermal image data for n elements for one row by each of the thermal-image acquisition elements $33_1$ to $33_n$, at each step moved by the sensor drive motor 24. The infrared sensor unit 30 acquires the pieces of thermal image data for y rows by acquiring the pieces of thermal image data for the n elements from the first stage to the y stage, where y is a natural number.

In the air conditioner 1, a master-slave relation is set to the control unit 25 and the sensor control unit 34. Specifically, the control unit 25 is set as a master and the sensor control unit 34 is set as a slave. The sensor control unit 34 is under control of the control unit 25, and the infrared sensor unit 30 is controlled by the control unit 25 via the sensor control unit 34.

Figure 3:
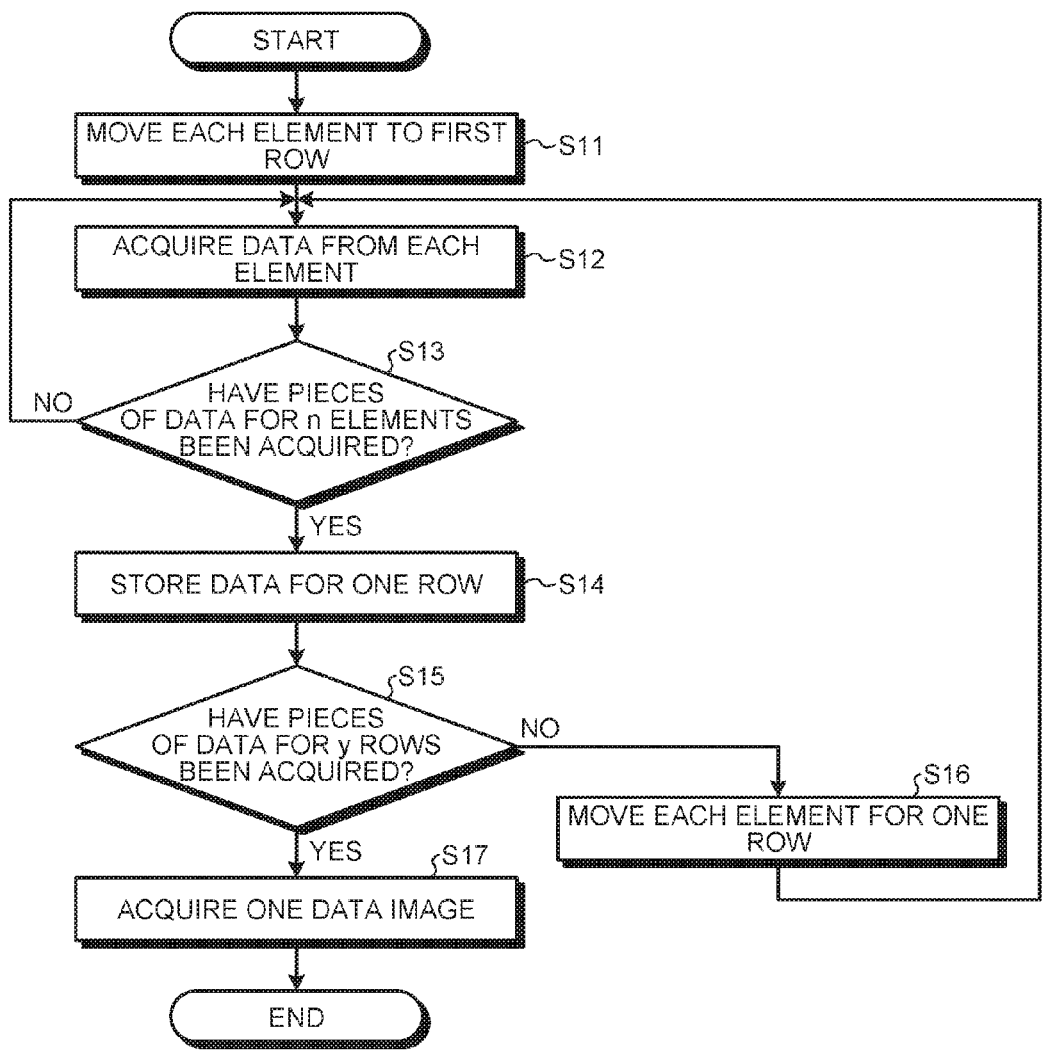
FIG. 3 is a flowchart illustrating a basic process of human detection in the air conditioner.

A human detection process in the air conditioner 1 is described with reference to FIG. 3 to FIG. 8. In the first embodiment, a case of detecting a human is described; however, an animal other than the human can be detected. FIG. 3 is a flowchart illustrating a basic process of human detection in the air conditioner 1. The control unit 25 repeatedly performs the process illustrated in FIG. 3. The control unit 25 drives the sensor drive motor 24 to move each of the thermal-image acquisition elements $33_1$ to $33_n$ to a first row (Step S11). Subsequently, the control unit 25 receives the thermal image data acquired by the respective thermal-image acquisition elements $33_1$ to $33_n$ via the sensor control unit 34 (Step S12). The control unit 25 determines whether the pieces of data for the n elements have been acquired (Step S13). When the control unit 25 determines that the pieces of data for the n elements have not been acquired (NO at Step S13), the process returns to Step S12 and the control unit 25 acquires the pieces thermal image data acquired from the thermal-image acquisition elements $33_1$ to $33_n$, which have not been acquired. The control unit 25 repeatedly performs the processes of Step S12 and Step S13 until the pieces of thermal image data for the n elements are acquired. When determining that the pieces of thermal image data for the n elements have been acquired (YES at Step S13), the control unit 25 stores the acquired pieces of thermal image data for the n elements in the storage unit 26, as thermal image data for one row (Step S14).

When having stored the thermal image data for one row, the control unit 25 determines whether the pieces of thermal image data for y rows have been acquired (Step S15). When determining that the pieces of thermal image data for y rows have not been acquired (NO at Step S15), the control unit 25 drives the sensor drive motor 24 to move the respective thermal-image acquisition elements $33_1$ to $33_n$ by one row (Step S16), and the process returns to Step S12. The control unit 25 repeats processes of Step S12 to Step S16 until the thermal image data for y rows are acquired. When determining that the data for y rows have been acquired (YES at Step S15), the control unit 25 acquires one data image created based on the acquired data for y rows (Step S17).

Figure 4:
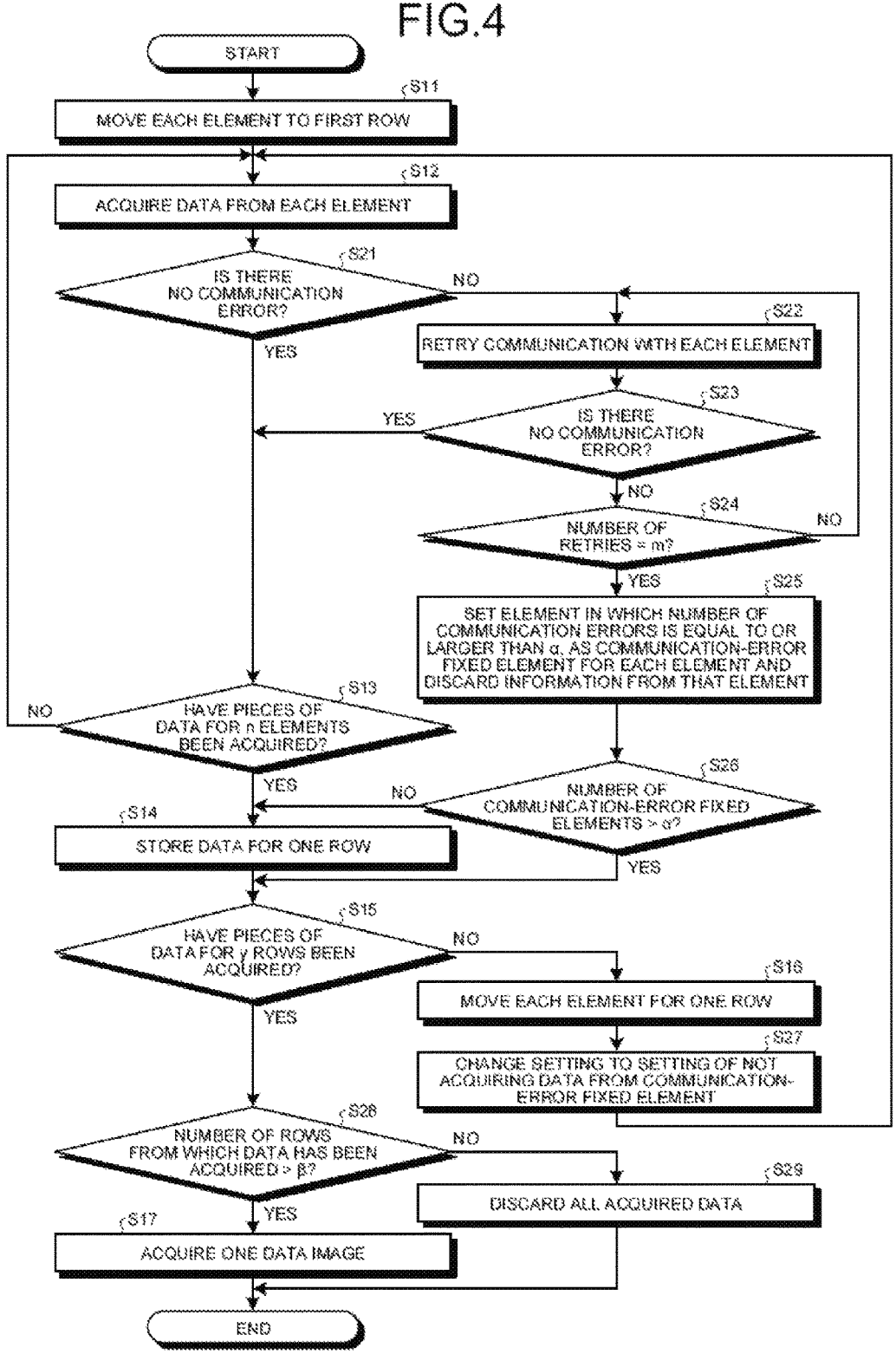
FIG. 4 is a flowchart illustrating a human detection process in the air conditioner according to a first embodiment.

A human detection process in the air conditioner 1 according to the first embodiment is described next with reference to FIG. 4 to FIG. 8. FIG. 4 is a flowchart illustrating the human detection process in the air conditioner 1 according to the first embodiment. In the flowchart in FIG. 4, an identical reference sign group to that of FIG. 3 is used for the similar processes in the flowchart in FIG. 3 illustrating a basic process, and detailed descriptions thereof will be omitted. The control unit 25 performs the process illustrated in FIG. 4 repeatedly.

The control unit 25 moves the respective thermal-image acquisition elements $33_1$ to $33_n$ to the first row (Step S11). Subsequently, the control unit 25 receives the thermal image data acquired from the respective thermal-image acquisition elements $33_1$ to $33_n$ via the sensor control unit 34 (Step S12). Upon reception of the thermal image data acquired from the thermal-image acquisition elements $33_1$ to $33_n$, the control unit 25 determines whether an error has occurred in communication for each of the thermal-image acquisition elements $33_1$ to $33_n$ (Step S21). When determining that there is no error in communication with the thermal-image acquisition elements $33_1$ to $33_n$ from which the thermal image data is acquired (YES at Step S21), the control unit 25 determines whether the pieces of data for the n elements have been acquired (Step S13).

When the control unit 25 determines that the pieces of data for the n elements have not been acquired (NO at Step S13), the process returns to Step S12, and the control unit 25 acquires the thermal image data from the thermal-image acquisition elements $33_1$ to $33_n$, from which the thermal image data has not been acquired. When determining that the pieces of thermal image data for the n elements have been acquired (YES at Step S13), the control unit 25 stores the acquired pieces of thermal image data for the n elements in the storage unit 26, as thermal image data for one row (Step S14).

When determining that an error has occurred in communication between the control unit 25 and at least one of the thermal-image acquisition elements $33_1$ to $33_n$ (NO at Step S21), the control unit 25 receives again the thermal image data from the respective thermal-image acquisition elements $33_1$ to $33_n$, that is, performs a communication retry (Step S22).

The control unit 25 determines whether an error has occurred in communication between the control unit 25 and at least one of the thermal-image acquisition elements $33_1$ to $33_n$ via the sensor control unit 34 (Step S23). When the control unit 25 determines that there is no error in communication with the thermal-image acquisition elements $33_1$ to $33_n$ from which the thermal image data has been acquired (YES at Step S23), the process proceeds to Step S13.

When determining that an error has occurred in communication with at least one of the thermal-image acquisition elements $33_1$ to $33_n$ (NO at Step S23), the control unit 25 determines the number of communication retries, that is, whether the number of receptions of the thermal image data from the respective thermal-image acquisition elements $33_1$ to $33_n$ is m times (Step S24). When the control unit 25 determines that a retry has not been performed for m times, that is, the number of retries is less than m times (NO at Step S24), the process returns to Step S22 and the control unit 25 performs a communication retry. The control unit 25 repeats the process of Step S22 to Step S24, until it is determined that all the elements do not have a communication error, or a communication retry is performed for m times, where m is a natural number.

When determining that a communication retry has been performed for m times (YES at Step S24), the control unit 25 counts the sum of the number of times of determination that an error has occurred in communication, for each of the thermal-image acquisition elements. The control unit 25 sets a thermal-image acquisition element for which the number of times of determination that an error has occurred in communication is equal to or larger than α, as a communication-error established element, stores the thermal-image acquisition element as the communication-error established element, counts the number of communication-error established elements, and discards the thermal image data acquired from the communication-error established elements (Step S25).

After performing the process at Step S25, the control unit 25 determines whether the number of communication-error established elements is larger than α (Step S26). When determining that the number of communication-error established elements is larger than α, (YES at Step S26), the control unit 25 determines that it is not useful to handle the thermal image data acquired at the current stage as data for one row, and discards the thermal image data without storing it in the storage unit 26, and the process proceeds to Step S15. On the other hand, when determining that the number of communication-error established elements is equal to or less than α (NO at Step S26), the control unit 25 determines that it is useful to handle the thermal image data acquired at the current stage as data for one row, and the process proceeds to Step S14. α is a natural number equal to or smaller than n.

When having stored the thermal image data for one row or having determined YES at Step S26, the control unit 25 determines whether the pieces of thermal image data for y rows have been acquired (Step S15). When determining that the pieces of thermal image data for y rows have not been acquired (NO at Step S15), the control unit 25 drives the sensor drive motor 24 to move the respective thermal-image acquisition elements $33_1$ to $33_n$ for one row (Step S16), and changes the setting to the setting of not acquiring the thermal image data from the communication-error established element (Step S27), and the process returns to Step S12. On the other hand, when the control unit 25 determines that the pieces of thermal image data for y rows have been acquired (YES at Step S15), the process proceeds to Step S28.

When having acquired pieces of data of the entire scanning area, that is, pieces of data for y rows, the control unit 25 determines whether the number of rows for which the thermal image data has been stored in the storage unit 26 is larger than β rows (Step S28). That is, when the control unit 25 has acquired the pieces of thermal image data of the entire scanning area, that is, for y rows, and if the number of rows for which the thermal image data has been stored in the storage unit 26 is larger than β rows, the control unit 25 acquires a data image based on the acquired thermal image data. If the number of rows for which the thermal image data has been stored in the storage unit 26 is equal to or less than β rows, the control unit 25 determines that a useful data image cannot be acquired, and discards all the pieces of acquired thermal image data. β is a threshold of the number of rows for which the thermal image data has been stored in the storage unit 26 in order to determine whether a useful data image can be acquired from the acquired thermal image data, and is a natural number in a range from 1 to less than y.

When determining that the number of rows for which the thermal image data has been stored in the storage unit 26 is larger than the β rows (YES at Step S28), the control unit 25 acquires one data image based on the acquired thermal image data (Step S17) and the process is finished. On the other hand, when determining that the number of rows for which the thermal image data has been stored in the storage unit 26 is equal to or less than the β rows (NO at Step S28), the control unit 25 determines that a useful data image cannot be acquired and discards all the pieces of acquired thermal image data (Step S29), and the process is finished.

FIG. 5 to FIG. 8 are explanatory diagrams illustrating an example of a communication result for one row between the control unit 25 and a plurality of the elements $33_1$ to $33_n$ of the infrared sensor unit 30. In FIG. 5 to FIG. 8, the horizontal axis corresponds to the number of times of acquiring data. "○" and "×" illustrated in FIG. 5 to FIG. 8 illustrate an acquisition result of the thermal image data by each of the thermal-image acquisition elements. "○" represents that the thermal image data has been acquired from the corresponding thermal-image acquisition element. "×" represents that the thermal image data has not been acquired from the corresponding thermal-image acquisition element.

Figure 5:
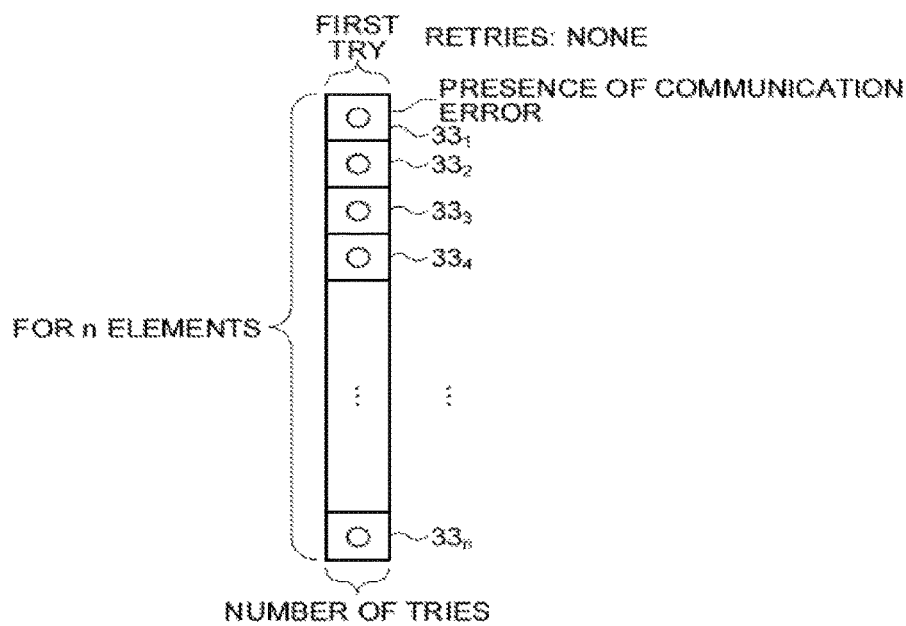
FIG. 5 is a diagram illustrating an example of a first communication result between a control unit and a plurality of elements of the infrared sensor unit.

As illustrated in FIG. 5, when the thermal image data has been acquired from the thermal-image acquisition elements $33_1$ to $33_n$, the control unit 25 determines that there is no communication error, determines YES at Step S21, and does not perform a communication retry.

Figure 6:
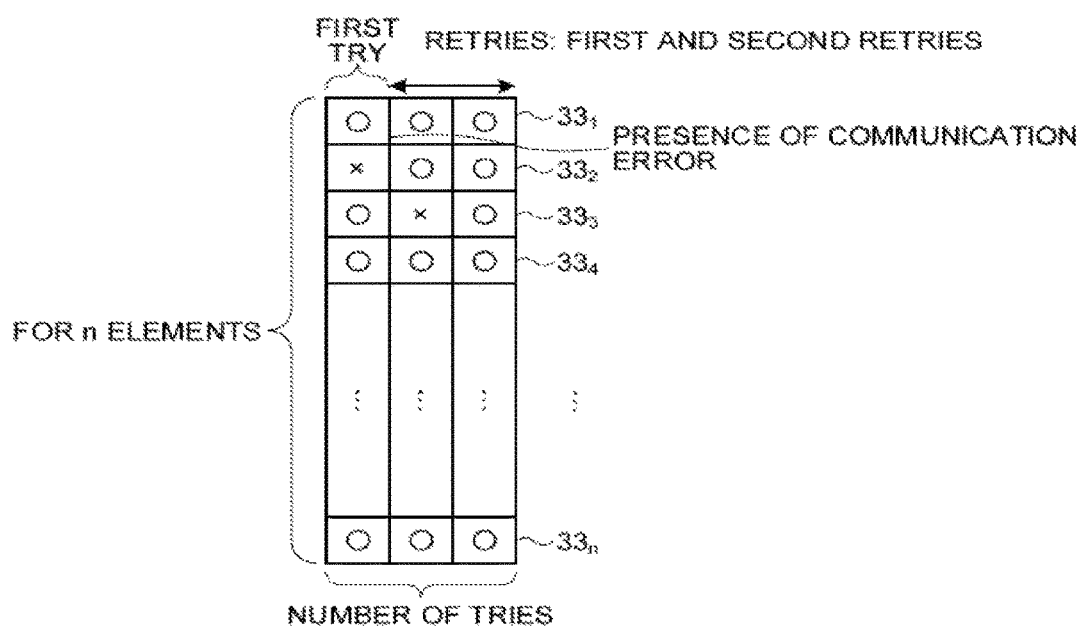
FIG. 6 is a diagram illustrating an example of a second communication result between the control unit and the plurality of elements of the infrared sensor unit.

As illustrated in FIG. 6, if an error has occurred in the thermal-image acquisition element $33_2$ in the first communication, but no error has occurred in other thermal-image acquisition elements, and in the first communication retry, if an error has occurred in the thermal-image acquisition element $33_3$, no error has occurred in other thermal-image acquisition elements, and there is no error in all the thermal-image acquisition elements $33_1$ to $33_n$ in the second communication retry, the control unit 25 determines NO at Step S21, determines NO at Step S23 in the first retry, and determines NO at Step S24, and the process returns to Step S22. Thereafter, the control unit 25 determines YES at Step S23 in the first retry, and the process proceeds to Step S13.

Figure 7:
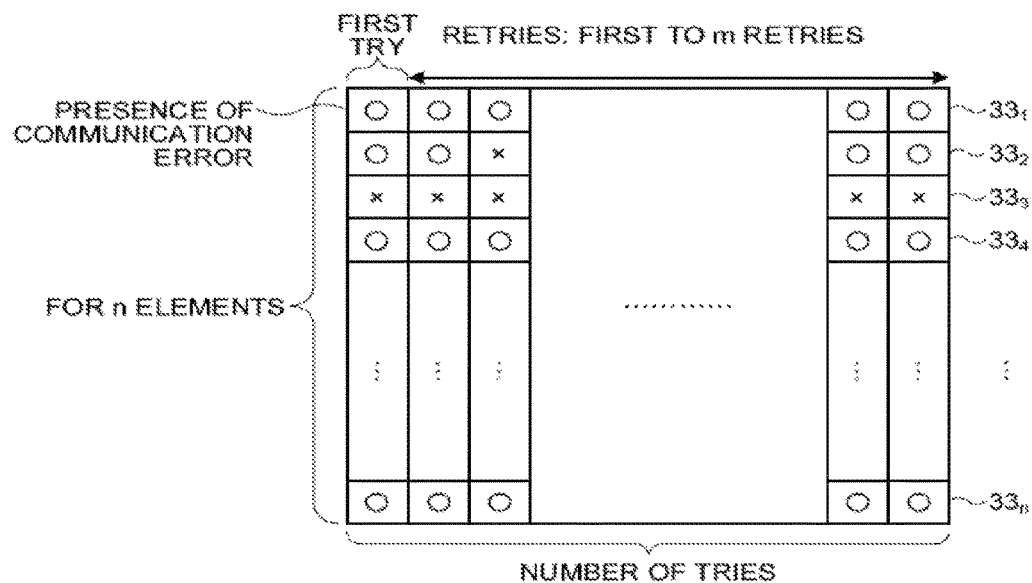
FIG. 7 is a diagram illustrating an example of a third communication result between the control unit and the plurality of elements of the infrared sensor unit.

As illustrated in FIG. 7, when determining that an error has occurred in the communication with the thermal-image acquisition element in the first communication and in all the m communication retries, the control unit 25 determines NO at Step S21. Further, the control unit 25 determines NO at Step S23 of all the retries from the first retry to the (m−1)th retry, determines NO at Step S24, and the process returns to Step S22. Thereafter, the control unit 25 determines NO at Step S23 in the mth retry, determines YES at Step S24 to set the thermal-image acquisition element $33_3$ as the communication-error established element, and discards the information acquired from the thermal-image acquisition element $33_3$.

If the communication-error established element is only the thermal-image acquisition element $33_3$ and the number of the communication-error established elements is less than α, the control unit 25 determines NO at Step S26, and stores the thermal image data for one row in the storage unit 26 (Step S14). The control unit 25 also sets the thermal-image acquisition element $33_3$, which has been determined as the communication-error established element, as a thermal-image acquisition element from which the thermal image data is not acquired. The control unit 25 then acquires the thermal image data from the thermal-image acquisition elements other than the thermal-image acquisition element $33_3$, which has been determined as the communication-error established element, in the case of acquiring the image of the next row as well as subsequent cases.

Figure 8:
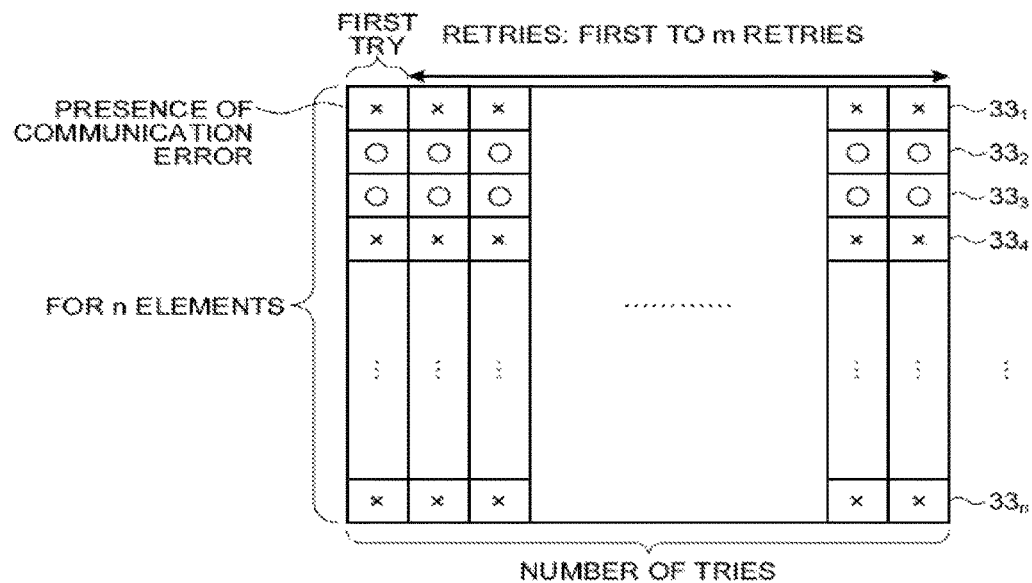
FIG. 8 is a diagram illustrating an example of a fourth communication result between the control unit and the plurality of elements of the infrared sensor unit.

Subsequently, when determining that an error has occurred in the communication with the thermal-image acquisition elements $33_1$, $33_4$, and $33_n$ in the first communication and in all the m communication retries, as illustrated in FIG. 8, the control unit 25 determines NO at Step S21, determines NO at Step S23 in all the retries from the first retry to the (m−1)th retry, and determines NO at Step S24, and the process returns to Step S22. Thereafter, the control unit 25 determines NO at Step S23 in the mth retry, determines YES at Step S24 to set the thermal-image acquisition elements $33_1$, $33_4$, and $33_n$ as the communication-error established elements, and discards the pieces of information acquired from the thermal-image acquisition elements $33_1$, $33_4$, and $33_n$.

If the communication-error established elements are the thermal-image acquisition elements $33_1$, $33_4$, and $33_n$ and the number of the communication-error established elements is equal to or larger than α, the control unit 25 determines YES at Step S26 and does not store the image data, and the process proceeds to Step S15. The control unit 25 also sets the thermal-image acquisition elements $33_1$, $33_4$, and $33_n$, which have been determined as the communication-error established elements, as the thermal-image acquisition elements from which the thermal image data is not acquired. The control unit 25 then acquires the thermal image data from the thermal-image acquisition elements other than the thermal-image acquisition elements $33_1$, $33_4$, and $33_n$, which have been determined as the communication-error established elements, in the case of acquiring the image of the next row as well as subsequent cases.

In the air conditioner 1 according to the first embodiment, an element whose sum of the number of times of determination that an error has occurred in communication is equal to or larger than a certain number, is set as the communication-error established element at an arbitrary stage, and it is set not to acquire the thermal image data from the element set as the communication-error established element at the subsequent stage. Accordingly, the communication time with the infrared sensor unit 30 can be made shorter than that in conventional cases.

The air conditioner 1 according to the first embodiment discards various pieces of information acquired from the element, which is set as the communication-error established element, and clears the information. Accordingly, the air conditioner 1 can avoid problems occurring in the thermal image data or in the data image ascribed to an error in communication, and improve the reliability of the thermal image data and the data image.

In the air conditioner 1 according to the first embodiment, the number of elements set as the communication-error established element is counted, and if the number of elements set as the communication-error established element is larger than the threshold, it is determined that it is not useful to handle the acquired thermal image data as data for one row, and the thermal image data is discarded without being stored in the storage unit 26. If the number of elements set as the communication-error established element is equal to or less than the threshold, it is determined that it is useful to handle the acquired thermal image data as data for one row and the thermal image data is stored in the storage unit 26. Accordingly, the air conditioner 1 can avoid problems occurring in the thermal image data or in the data image ascribed to an error in communication, and improve the reliability of the thermal image data and the data image.

In the air conditioner 1 according to the first embodiment, when the data of the entire scanning area is acquired or acquisition thereof is retried, and if the number of rows for which the thermal image data has been stored in the storage unit 26 is larger than the threshold, the data image is acquired based on the acquired thermal image data. If the number of rows for which the thermal image data has been stored in the storage unit 26 is equal to or less than the threshold, it is determined that the useful data image cannot be acquired, and all the pieces of acquired thermal image data are discarded. Accordingly, the air conditioner 1 can avoid problems occurring in the thermal image data or in the data image ascribed to an error in communication, and improve the reliability of the thermal image data and the data image.

Second Embodiment

In an air conditioner according to a second embodiment, an identical reference sign group to that of the air conditioner 1 according to the first embodiment is used for a configuration identical to that of the air conditioner 1, and detailed descriptions thereof will be omitted. In addition to the function of the control unit 25, a control unit provided in the air conditioner according to the second embodiment has a function of extracting an element determined to have an error in communication, if it is determined that an error has occurred in communication with at least one of the thermal-image acquisition elements $33_1$ to $33_n$, at the same stage and retrying the communication with the extracted element in order to retry reception of the thermal image data from the extracted element.

Figure 9:
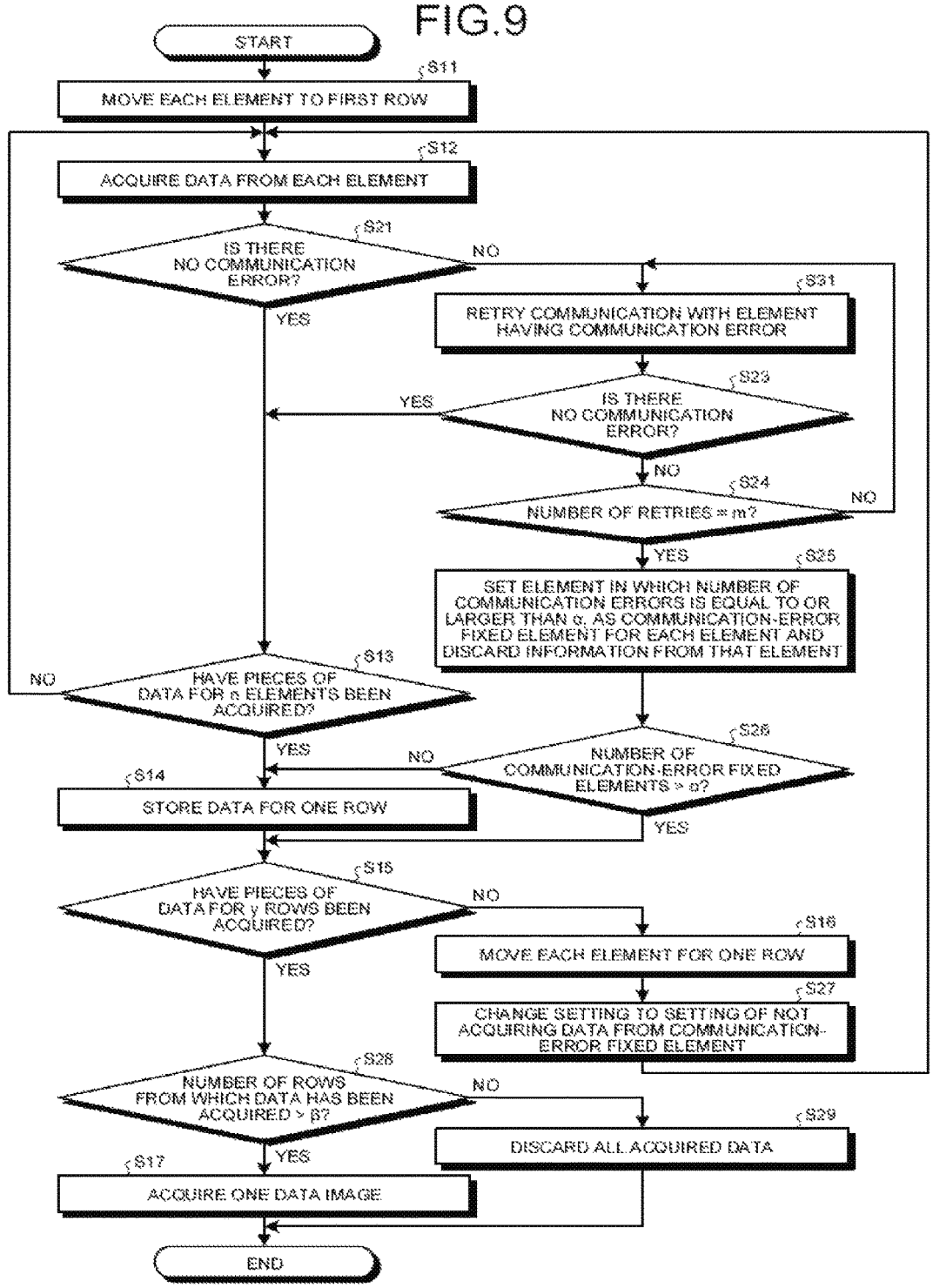
FIG. 9 is a flowchart illustrating a human detection process in an air conditioner according to a second embodiment.

FIG. 9 is a flowchart illustrating a human detection process in the air conditioner according to the second embodiment. In the process of the control unit, a process at Step S31 illustrated in FIG. 9 is replaced by the process at Step S22 performed by the control unit 25 according to the first embodiment. When it is determined that an error has occurred in the communication with at least one of the thermal-image acquisition elements $33_1$ to $33_n$ (NO at Step S21), the control unit extracts an element determined to have an error in communication, and retries reception of the thermal image data from the extracted element (Step S31).

In the air conditioner according to the second embodiment, when it is determined that an error has occurred in the communication with at least one of a plurality of elements, the element determined to have an error in communication is extracted at the same stage, and reception of the thermal image data from the extracted element is retried. Accordingly, the communication time with the infrared sensor unit 30 in the retry can be made shorter than that in conventional cases.

Third Embodiment

In an air conditioner according to a third embodiment, an identical reference sign group to that of the air conditioner 1 according to the first embodiment is used for a configuration identical to that of the air conditioner 1, and detailed descriptions thereof will be omitted. In addition to the function of the control unit 25, a control unit provided in the air conditioner according to the third embodiment has a function of replacing various pieces of information acquired from an element set as the communication-error established element by alternative data based on the ambient temperature acquired by the temperature sensor unit 23, instead of the function of discarding and clearing the various pieces of information acquired from the element set as the communication-error established element. Further, the control unit according to the third embodiment has a function of setting the alternative data based on the ambient temperature acquired by the temperature sensor unit 23 to be used as the data to be received from the element set as the communication-error established element at an arbitrary stage, in addition to the function of setting of not acquiring the thermal image data at the subsequent stage from the element set as the communication-error established element at an arbitrary stage.

Figure 10:
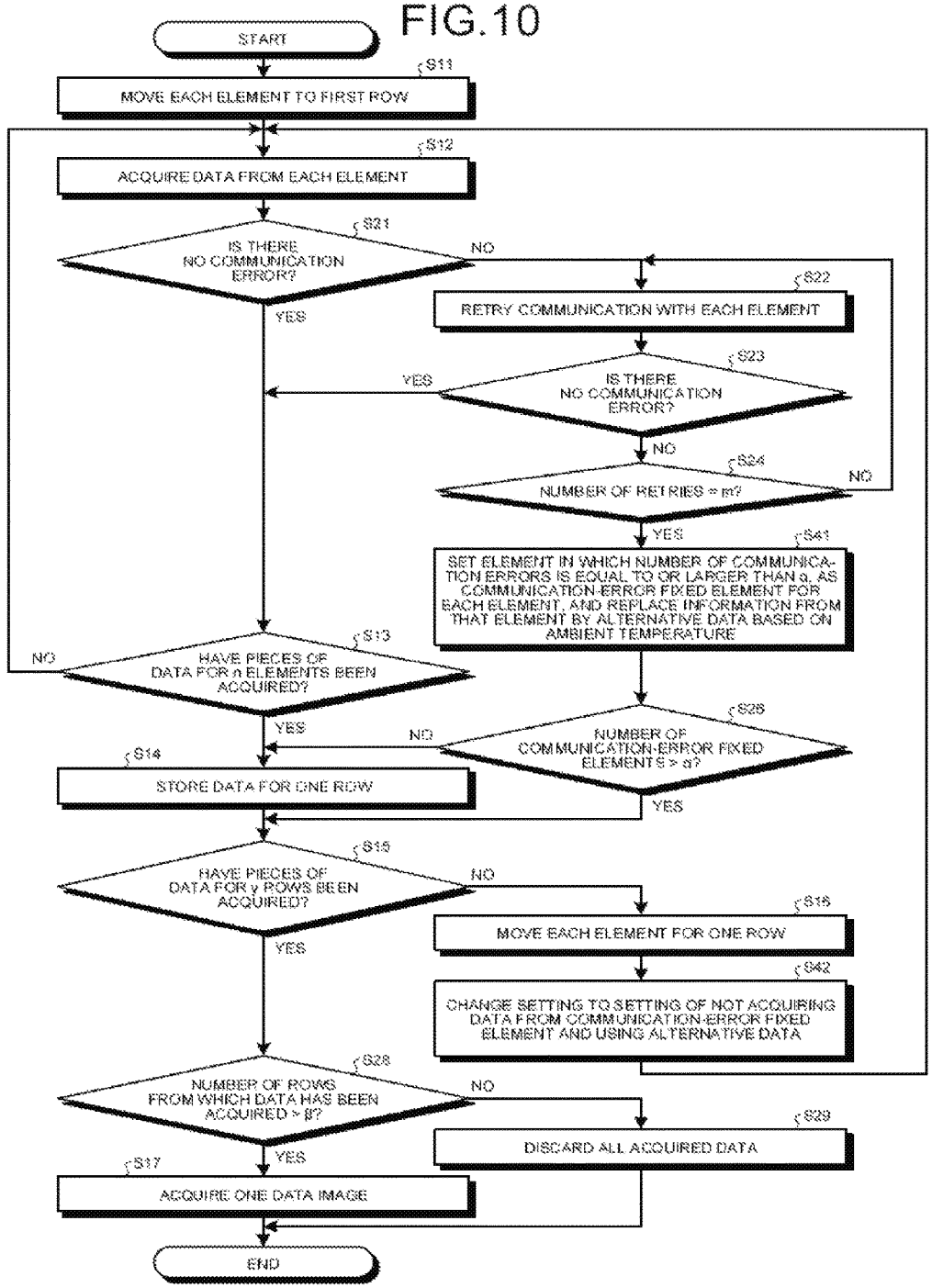
FIG. 10 is a flowchart illustrating a human detection process in an air conditioner according to a third embodiment.

FIG. 10 is a flowchart illustrating a human detection process in the air conditioner according to the third embodiment. The control unit performs processes of Step S41 and Step S42 illustrated in FIG. 10 instead of the processes of Step S25 and Step S27 performed by the control unit 25 according to the first embodiment. If a communication retry of the thermal image data has been performed for m times (YES at Step S24), the control unit counts the sum of the number of times of determination that an error has occurred in communication, for each element. The control unit sets an element in which the number of times of determination that an error has occurred in communication is equal to or larger than α, as the communication-error established element. The control unit replaces the thermal image data or various pieces of information acquired from the communication-error established element by alternative data based on the ambient temperature acquired by the temperature sensor unit 23 (Step S41).

When pieces of data for y rows have not been acquired (NO at Step S15), the control unit performs the process at Step S16, and before performing the process at Step S12 at the next stage, the control unit does not acquire the thermal image data from the communication-error established element at the current stage as well as subsequent stages. The control unit then changes the setting to the setting of using the alternative data based on the ambient temperature acquired by the temperature sensor unit 23 as the data to be received from the element set as the communication-error established element at an arbitrary stage (Step S42), and brings the process flow forward to Step S12 at the next stage.

The air conditioner according to the third embodiment uses the alternative data based on the ambient temperature acquired by the temperature sensor unit 23 as the data to be received from the element set as the communication-error established element at an arbitrary stage. Accordingly, the air conditioner can avoid problems occurring in the thermal image data or in the data image ascribed to an error in communication, and improve the reliability of the thermal image data and the data image.

Fourth Embodiment

In an air conditioner according to a fourth embodiment, an identical reference sign group to that of the air conditioner 1 according to the first embodiment is used for a configuration identical to that of the air conditioner 1, and detailed descriptions thereof will be omitted. In addition to the function of the control unit 25, a control unit provided in the air conditioner according to the fourth embodiment has a function of resetting information that an element is set as the communication-error established element, when the air conditioner is switched from a shutdown state to an operation start state.

Figure 11:
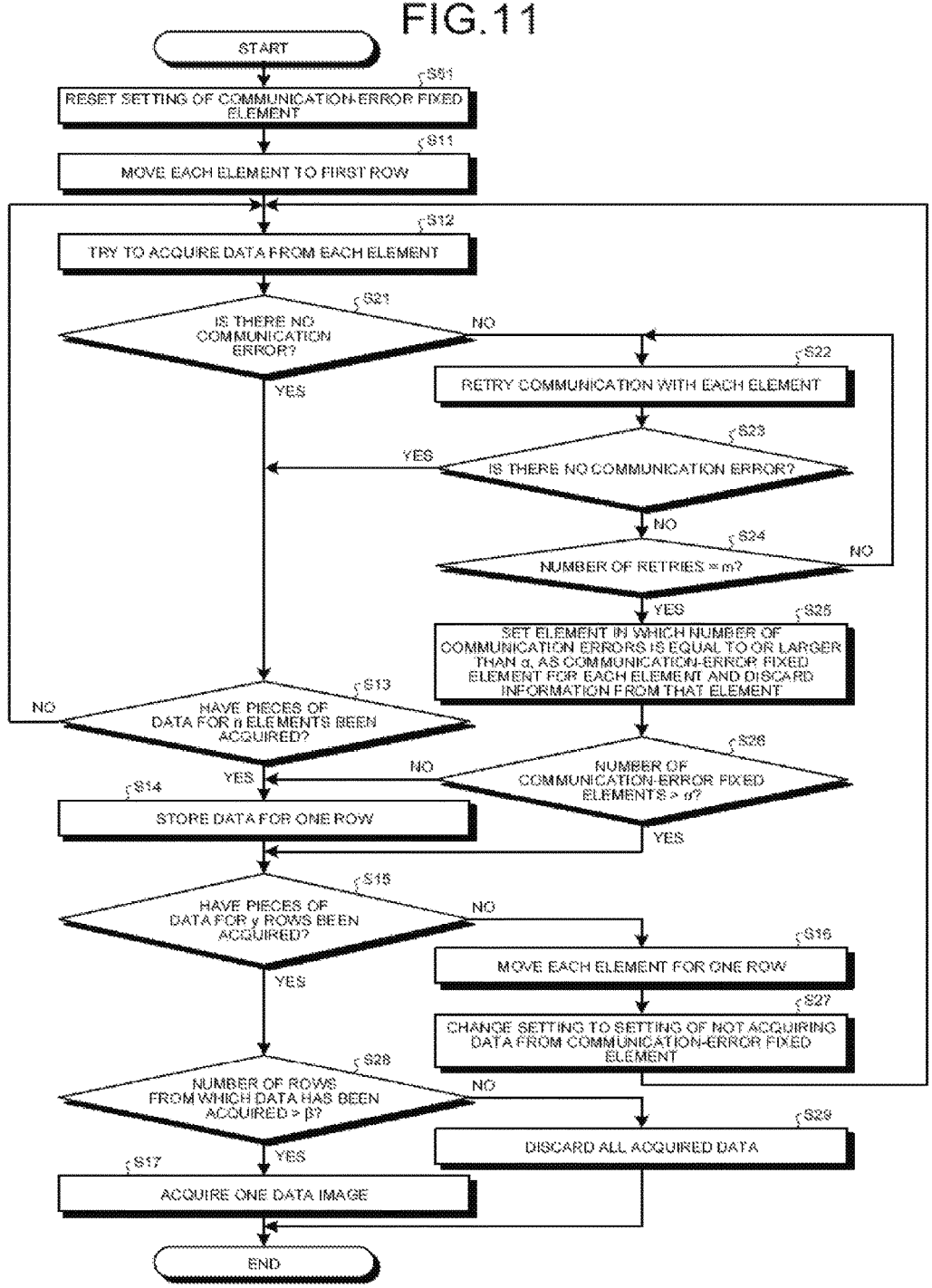
FIG. 11 is a flowchart illustrating a human detection process in an air conditioner according to a fourth embodiment.

FIG. 11 is a flowchart illustrating a human detection process in the air conditioner according to the fourth embodiment. The control unit performs a process at Step S51 illustrated in FIG. 11, before performing the process at Step S11 to be performed by the control unit 25 according to the first embodiment. When the air conditioner is switched from a shutdown state to an operation start state, the control unit resets the information that the element is set as the communication-error established element (Step S51) and brings the process flow forward to Step S11.

When the air conditioner according to the fourth embodiment is switched from a shutdown state to an operation start state, the air conditioner resets the information that the element is set as the communication-error established element. Accordingly, the air conditioner can improve the reliability of the thermal image data and the data image acquired from the element.

The configuration described the above embodiment is only an example of the contents of the present invention. The configuration can be combined with other well-known techniques, and it is needless to mention that the present invention can be configured while modifying it without departing from the scope of the invention, such as omitting a part of the configuration.

The invention claimed is:

1. An air conditioner comprising:
an indoor device; and
an outdoor device connected to the indoor device, wherein
the indoor device includes:
a first controller;
an infrared sensor unit that has a plurality of infrared sensors and a second controller that controls the infrared sensors, scans a scanning area step-by-step to acquire thermal image data by the infrared sensors at each step, and transmits the acquired thermal image data from the second controller to the first controller; and
a sensor drive motor that moves the infrared sensor unit,
the first controller determines whether an error has occurred in communication for each of the infrared sensors, at a time of reception of the thermal image data transmitted from the second controller,
the first controller sets one of the infrared sensors for which a sum of determinations that an error has occurred in the communication is equal to or larger than a threshold as an erroneous infrared sensor and does not acquire thermal image data from the erroneous infrared sensor, and
when the air conditioner is switched from a shutdown state to an operation start state, the air conditioner resets the setting of one infrared sensor as the erroneous infrared sensor and acquires thermal image data from all of the infrared sensors.

2. The air conditioner according to claim 1, wherein when determining that an error has occurred in the communication, the first controller acquires thermal image data again from the erroneous infrared sensor.

3. The air conditioner according to claim 1, wherein the first controller uses alternative data based on an ambient temperature acquired from a temperature sensor unit provided in the indoor device as thermal image data at a position acquired by the erroneous infrared sensor.

* * * * *